Sept. 14, 1965 KOJI TERAMOTO ETAL 3,206,378
PURIFICATION OF MIXED ISOMERS OF DICYANOBENZENES BY
VACUUM DISTILLATION
Filed Sept. 26, 1962
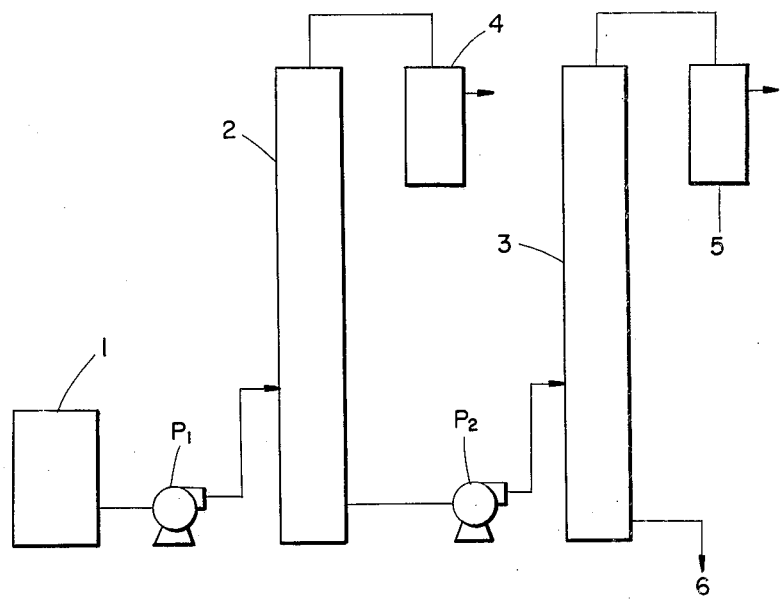
INVENTORS
KOJI TERAMOTO
TAIJIRO OGA
BY MASATOMO ITO
ATTORNEY United States Patent Office 3,206,378
Patented Sept. 14, 1965

3,206,378
PURIFICATION OF MIXED ISOMERS OF DICYANOBENZENES BY VACUUM DISTILLATION
Koji Teramoto, Taijiro Oga, and Masatomo Ito, Haramachi, Ohta-ku, Tokyo, Japan, assignors to Showa Denko Kabushiki Kaisha, Tokyo, Japan, a corporation of Japan
Filed Sept. 26, 1962, Ser. No. 226,243
Claims priority, application Japan, June 16, 1962, 37/24,442
7 Claims. (Cl. 202—42)

This invention relates to a method of purifying to high purity and in good yield crude mixed dicyanobenzenes without changing substantially the compositional proportion of the mixed meta and para isomers. More particularly, it relates to a method of purifying mixed dicyanobenzenes which comprises carrying out the vacuum distillation of crude mixed dicyanobenzenes containing meta- and paradicyanobenzenes at at least its melting temperature, preferably in its molten condition and at a temperature of 150–250° C.

Although dicyanobenzenes are prepared from such as xylene, phthalic acid, etc., by a number of processes, in all cases, on account of their content of impurities, they are unfit to be used in their as-obtained state as intermediates of, for example, polyamides and polyesters. Thus, there is the necessity of purification by a suitable method.

As such methods of purification that have been practiced hitherto, there are such as the method of mixing the crude dicyanobenzene with water and then blowing in an inert gas such as steam, nitrogen, etc. while heating, thereby removing the impurities; the method of treating with water, alcohols, fatty acids, nitric acid, and other solvents; or the recrystallization method. However, they were very disadvantageous from the commercial standpoint in that their degree of purification being insufficient those of high purity could not be obtained, or with the purification losses being great the yield would be low, or in that there was the need for complicated steps in such operations of heating, melting, washing, cooling, filtering and drying.

Recently with the development of polyamide synthetic fibers having xylene diamines as the starting material, from the standpoint of the properties of the finished textile and economy, as said xylene diamines, in most cases a mixture of meta and para isomers are being used. Hence, if a meta and para mixed crude dicyanobenzene which is obtained by catalytically reacting over a suitable catalyst such, for example, as a vanadium compound, a gas containing meta and para mixed xylene, ammonia and oxygen, could be purified to high purity and in good yield without changing the compositional proportion of the mix, it would be very advantageous and effective commercially. And such a purification method would be in great demand. On the other hand, according to the conventional methods, not only is there a need for complicated and disadvantageous operations, but also with the occurrence of changes in the compositional proportion being inevitable by its very nature, subsequent readjustment of the compositional proportion becomes necessary.

As a result of our researches for finding a method of purifying a mixed dicyanobenzene containing meta- and paradicyanobenzenes in which all of these defects of the conventional methods could be overcome without changing the compositional proportion of the mix by means of an apparatus and operations that are simple, we found that meta- and paradicyanobenzenes have surprisingly high vapor pressures, and that by the vacuum distillation of the mixed dicyanobenzene in its molten condition of a temperature of 150–250° C. the purification to high purity and in good yield could be effected without any substantial change whatsoever in the compositional proportion of the mix and moreover with extremely simple operations in spite of the fact that the compositional proportion of such a mixed dicyanobenzene changes markedly when sublimated under reduced pressures at about 140° C. Moreover, we found that in spite of the fact that it was very difficult to purify paradicyanobenzene alone in its molten condition because of the difficulty involved with respect to the heating means, the setting up of decomposition, and for other reasons, in accordance with the method of the present invention melt-purification is made possible. In addition, it was found not only that the crude mixed dicyanobenzene containing the mixture of ortho, meta and para could be purified, but also it was possible to purify mixed dicyanobenzenes without changing the compositional proportion of the meta and para isomers from the crude mixed dicyanobenzene containing the impurities such as phthalic acid, isophthalic acid, terephthalic acid and the acid amides thereof; phthalimide, benzonitrile, o-, m-, and p-tolunitrile, o-, m-, and p-cyanobenzoic acid and the acid amides thereof; water; ammonium carbonate; ammonium cyanide; etc.

Accordingly, it is an object of the present invention to provide a method of purifying to high purity and in good yield very advantageously and effectively on a commercial scale crude mixed dicyanobenzenes containing meta- and paradicyanobenzenes without changing the compositional proportion of the mix.

Another object of the invention is to provide a method of effecting such purification continuously.

Other objects and advantages of this invention will be apparent from the following description.

Meta- and paradicyanobenzenes are solids having melting points of 160–161° C. and 222–225° C., respectively. And according to our studies, their vapor pressures at 140° C. being about 14.6 mm. Hg and about 3.0 mm. Hg, respectively, a considerable difference exists between the two. Hence, when a mixture of these two is just merely sublimated under reduced pressure at 140° C. in the solid state, the composition of the purified product will be a composition very different from that which existed prior to the purification.

On the other hand, as a result of having inquired into the relationship between the composition of the meta and para mixed dicyanobenzene and the temperature required for completely melting it, it was found that the temperature required for completely melting the mixture falls markedly from the melting point of that of paradicyanobenzene itself, the temperature required for complete melting in case of, for example, a meta and para mixed dicyanobenzene containing 10% of paradicyanobenzene being about 150° C.

In addition, when inquiry was made into the vapor pressure of the meta and para mixed dicyanobenzene which melts at such a low temeprature, we found that the relative volatility of paradicyanobenzene with respect to metadicyanobenzene in its molten state was about 1.0. Thus, it was found by carrying out the vacuum distillation at a temperature of 150–250° C. of a crude mixed dicyanobenzene containing meta- and paradicyanobenzenes in its molten state the purifiication could be effected readily without causing hardly any change in composition. These effects are all the more clear from the results shown in Table I, below. In this table are shown the changes that occurred in the proportion of the meta and para isomers as analyzed by infra-red spectrum in case of 100 grams of a crude mixed dicyanobenzene whose ratio of meta to para was 75.9:24.1, which on one hand was merely sublimated under reduced pressure while on the other was distilled according to the method of the present invention by being vacuum distilled in its molten state.

TABLE I

| Method | Temperature (° C.) | Reduced Pressure (mm. Hg) | Composition of Purified Product | | Yield of Purified Product (g.) | Residue (g.) |
| --- | --- | --- | --- | --- | --- | --- |
| | | | Meta Percent | Para Percent | | |
| Sublimation Under Reduced Pressure | 140 | 18 | 83.4 | 16.6 | 88 | 11 |
| Method of Present Invention | 180 | 61 | 75.6 | 24.4 | 97 | 2 |

As is apparent from the results of Table I, above, when purification was carried out by sublimation the variation in the compositional proportion of the meta and para isomers was extremely great, whereas when purification was carried out according to the present invention there was substantially no change observed.

Although the distillation temperature will vary depending upon the composition of the mixed dicyanobenzene, a temperature ranging between 150° and 250° C. is suitable. While a temperature higher than that required for complete melting of the mixture will suffice in order to preclude the danger of solidifying, preferably the purification is carried out at a temperature 20° C. higher than the temperature required for completely melting the mixture. While operation at above 250° C. is also possible, since decomposition, although slight, of the dicyanobenzene occurs, in order to avoid this and also from the point of commercial advantageousness and practicality preferred is a temperature of less than 250° C.

Again, while the proportion of mix of metadicyanobenzene and paradicyanobenzene can be varied over a wide range, in view of the fact that the eutectic point thereof inclines relatively to the metadicyanobenzene side, those in which the paradicyanobenzene content is on the order of 1–100% by weight of the metadicyanobenzene are from the operation standpoint advantageous.

Again, while the crude meta and para mixed dicyanobenzene that is obtained by catalytically reacting over a suitable catalyst such as, for example, a vanadium compound, a gas containing meta and para mixed xylene, ammonia and oxygen contains numerous impurities such as, for example, tolunitriles, water, cyanobenzoic acid and the acid amides thereof, ammonium cyanide, etc. these can be readily removed since they differ markedly from dicyanobenzenes in their vapor pressures.

Furthermore, the method of this invention can also be likewise carried out satisfactorily even though orthodicyanobenzene is concurrently contained. For example, the method of the invention is also applicable to those crude dicyanobenzenes which contain in the crude meta and para mixed dicyanobenzene orthodicyanobenzene, pthalimide, and benzonitrile that are derived from the orthoxylene and ethyl benzene in the raw meta and para mixed xylene, the starting material for the preparation of the meta and para mixed dicyanobenzene. That is to say, the relative volatilities with respect to metadicyanobenzene of orthodicyanobenzene, phthalimide, benzonitrile in their molten state are about 0.5, about 0.2, and about 12, respectively; and thus it was confirmed that the purification could be accomplished by separating the foregoing compounds readily from the meta and para mixed dicyanobenzene by means of the method of this invention and moreover without any change being made in the composition of the latter.

The purified dicyanobenzene obtained by means of the method of this invention is pure white and odorless, and no abnormalities at all are observable by either the ultraviolet or infrared absorption spectra.

Further, in carrying out the method of the invention, the crude meta and para mixed dicyanobenzene that is formed by the reaction may be washed in advance with water, or with an alkali solution such as that of caustic soda, caustic potash, sodium carbonate, etc, an acid solution such as that of nitric acid, hydrochloric acid, phosphoric acid, acetic acid, etc. or an organic solvent such as alcohol, acetone, etc.

Again, since the feature of the invention resides particularly in the point that the melt-distillation is effected from a crude mixed dicyanobenzene containing meta- and paradicyanobenzenes without substantially changing the proportion of the mixture of its meta and para isomers, it goes without saying that the method of the invention when utilized in connection with the crude mixed dicyanobenzene containing principally the meta and para isomers is of particular advantage.

Additionally, in the method of this invention, if the mixed dicyanobenzene vapor that distills off is cooled at a temperature above that at which the mixture is completely melted, the purified product can be obtained in liquid form. Hence, it becomes possible to operate continuously with the liquid form, the handling of solids being obviated. Thus, according to the method of this invention the purification of crude mixed cyanobenzenes can be carried out very advantageously and effectively on a commercial scale from the standpoints of equipment and operations management.

The accompanying drawing illustrates one example of an apparatus suitable for practicing the method of the invention by a continuous method, wherein: 1 is the melting tank for melting the material crude mixed dicyanobenzene, $P_1$ and $P_2$, the pumps for conveying the material, 2, the first rectifying tower, 3, the second rectifying tower, 4, the cooler, and 5, the receptacle for collecting the purified product. The mixed dicyanobenzene is first heated and melted in the melting tank 1. The heating employed may be either by direct or indirect heating as conventionally employed, and while the heat-source may also be by those known such as the method of using a heating medium such as an electric heater, superheated steam, gas burner, oil burner or a heat transfer medium such as dowtherm, preferred from the points of temperature regulation and other advantages is the method of using either superheated steam or dowtherm. The thus melted mixed dicyanobenzene is then continuously fed to the first rectifying tower by means of the pump $P_1$ for conveying the material and while maintaining its molten state is vacuum distilled in its molten condition at a 150–250° C. temperature. As regards the degree of reduced pressure, that about 20 mm. Hg–750 mm. Hg, preferably 40–150 mm. Hg is satisfactory for carrying out the operation. The distilled low boiling fraction (high vapor pressure fraction) is conducted from the top of the tower to the cooler 4 where it is cooled and continuously collected and removed. The high vapor pressure fraction that is collected comprises, for example, tolunitriles, water, ammonium carbonate, etc., the tolunitriles being utilizable as the starting material for preparing dicyanobenzene. On the other hand, the bottom liquor is continuously withdrawn and fed continuously to the second rectifying tower 3 by means of pump $P_2$ for conveying the material. Needless to say that the operation is carried out while maintaining the molten state of the material. In the second rectifying tower, vacuum distillation is carried out continuously under molten conditions, preferably under molten conditions of a temperature of 150–250° C. Normally, the degree of reduced pressure is suitably about 20 mm. Hg–400 mm. Hg, preferably 40–150 mm. Hg. Thus, the vacuum distillation is carried out continuously under molten conditions and the distilled high boiling fraction (low vapor pressure fraction) is removed from the bottom of the tower 6, while on the other hand, the purified mixed dicyanobenzene whose proportion of mix of meta and para isomers remain substantially unchanged is continuously withdrawn from the top of the tower and collected in the receptacle 5 for the finished product. By cooling the mixed dicyanobenzene vapor at the receptacle 5 to condense it to the liquid form to an extent as will enable the maintenance of a temperature above that required for its complete melting depending upon the particular mixture ratio of the mixture, the purified product is continuously drawn off in its liquid form. The drawn off liquid is cooled by allowing to stand or by forced cooling, whereby a pure white, odorless purified mixed dicyanobenzene solid is obtained efficiently in good yield and high purity without changing substantially the original ratio of the meta and para isomers contained in said mixed dicyanobenzene.

At least one rectifying tower will do, normally a first and a second rectifying tower being sufficient, but an increase beyond that number is also possible.

Although the invention has been described with reference to the accompanying drawing by giving one example of an apparatus suited for carrying out the method of the invention continuously, it is to be understood that the present invention is not restricted to its practice by the employment of such an apparatus.

In order for a clearer understanding of the present invention, the following examples are given:

Example 1

A crude meta and para mixed dicyanobenzene (the ratio of the metadicyanobenzene to paradicyanobenzene being 78.2:21.8) obtained by catalytically reacting over a vanadium type catalyst a gas containing meta and para mixed xylene, ammonia and oxygen was rendered into a molten state by heating. Then the distillation thereof was effected under a reduced pressure of 39 mm. Hg at 167° C. whereby was obtained a pure white, odorless purified product (the ratio of metadicyanobenzene to paradicyanobenzene being 78.0:22.0). No abnormalities whatsoever were observed in the ultraviolet and infrared spectra of this product.

Example 2

To 100 grams of a mixed dicyanobenzene of the same composition as in Example 1 was added 200 parts of water. This was placed in a ball mill, and after washing with stirring for 20 minutes at room temperature, it was filtered. The crude mixed dicyanobenzene was dried, then after it had reached a molten state by heating, it was distilled under a reduced pressure of 76 mm. Hg at 183.5° C. whereby was obtained a pure white, odorless purified product (the ratio of metadicyanobenzene to paradicyanobenzene being 78.0:22.0). In this case, the low boiling fraction was less than in case of Example 1.

Example 3

A mixed dicyanobenzene of the same composition as in Example 1 was heated employing the apparatus illustrated in the accompanying drawing thereby rendering into a molten state, following which it was continuously fed to the first rectifying tower where it was continuously distilled under a reduced pressure of 86 mm. Hg, the low boiling fraction boiling below 185° C. (high vapor pressure fraction) at this tower being removed from the top of the tower while the bottom liquor was fed to the second rectifying tower. The second rectifying tower was operated continuously under reduced pressure conditions of 86 mm. Hg, and the high boiling fraction (low vapor pressure fraction) was removed from the bottom of the tower while the distillate of 190 ±2° C. was drawn off continuously into the receptacle for the purified product. The purified product obtained was pure white in color and odorless, and the ratio of the meta to para isomers was 78:22 while the yield was 92.2% based on the crude dicyanobenzene.

Example 4

Except that the vapor of the meta and para mixed dicyanobenzene was cooled and condensed while maintaining a temperature that would not fall below the melting point of the mixture, i.e., about 150° C., by causing the boiling under reflux of a 93% aqueous ethylene glycol solution around the outside of the receptacle for the receptacle for the purified product, this example was carried out exactly as in Example 3 whereby was obtained a purified product of meta and para mixed dicyanobenzene in liquid form. The ratio of the metadicyanobenzene to paradicyanobenzene in the purified product was 78.0:2.0.

Example 5

Except that a crude mixed dicyanobenzene having a mixture ratio of meta and para of 99.0:1.0 was used and the operation was carried out under a reduced pressure of 76 mm. Hg and molten condition at 184° C., this experiment was carried out exactly as in Example 1 whereby was obtained a purified mixed dicyanobenzene with the meta and para mixture ratio of 99.0:1.0 of the original composition remaining unchanged. The purified product obtained was pure white and odorless, and no abnormalities whatsoever were observed in its ultraviolet and infrared absorption spectra.

Example 6

Except that a crude mixed dicyanobenzene having a meta and para mixture ratio of 60.4:39.6 was used and the operation was carried out at a reduced pressure of 86 mm. Hg and under molten conditions of a temperature of 190° C., the same procedures as in Example 1 were followed whereby was obtained a pure white, odorless purified product whose meta and para mixture ratio was 60.1:39.9.

Example 7

The same procedures as in Example 3 were followed, except that the crude mixed dicyanobenzene used was that containing meta and paradicyanobenzene (ratio of meta to para of 4.2:1) and having the following composition, namely:

| | Percent |
|---|---|
| Metadicyanobenzene | 63 |
| Paradicyanobenzene | 15 |
| Orthodicyanobenzene | 7 |
| Phthalimide | 8 |
| Benzonitrile | 7 | and the first rectifying tower was operated at a pressure of 60 mm. Hg whereat was removed a low boiling fraction boiling below 110° C., while the second rectifying tower was operated at a pressure of 60 mm. Hg and the temperature at which the distillate from the top of the second rectifying tower, the purified product, was collected was 180° C. whereby was obtained the purified product by the same continuous operation. The purified product contained 80.5% of metadicyanobenzene, 19.2% of paradicyanobenzene, 0.2% orthodicyanobenzene, and less than 0.1% of phthalimide and benzonitrile. The meta and para ratio of the purified product was 4.19:1.

Although several modes of practicing the invention have been described hereinabove, it is to be understood that the invention is not to be restricted to the foregoing examples, but various changes and modifications can be made in the melting conditions, reduced pressure conditions, operational methods, mixing proportions of the starting materials, etc. without departing from the scope of the appended claims.

Having thus described the nature of the invention, what is claimed is:

1. A method of purifying mixed dicyanobenzenes which comprises heating a crude mixture of dicyanobenzenes containing meta- and para-dicyanobenzenes above the melting point of the mixture, distilling the molten mixture at a temperature of about 167–192° C. and at a pressure of about 39–86 mm. of mercury, recovering purified meta- and para-dicyanobenzenes in the form of mixed vapors having the same ratio of meta- to pari-isomers as was present in the crude mixture.

2. A method according to claim 1, in which the mixed vapors of meta- and para dicyanobenzenes are condensed to a liquid.

3. A method according to claim 1, in which the crude mixture of dicyanobenzene contains at least 1% by weight of the para-isomer.

4. A method according to claim 3, in which the crude mixture of dicyanobenzenes contains at least one impurity selected from the group consisting of orthodicyanobenzene, phthalic acid, phthalic acid amide, isophthalic acid, isophthalic acid amide, terephthalic acid, terephthalic acid amide, phthalimide, benzonitrile, o-, m-, and p-tolunitrile, o-, m-, and p-cyanobenzoic acid, o-cyanobenzoic acid amide, m-cyanobenzoic acid amide, p-cyanobenzoic acid amide, water, ammonium carbonate, and ammonium cyanide.

5. A method according to claim 1, in which the crude mixture of dicyanobenzenes is purified by washing prior to melting and distillation.

6. A method of continuously purifying a mixture of dicyanobenzenes which comprises heating a mixture of crude dicyanobenzenes containing meta- and para-dicyanobenzenes to a temperature above the melting temperature of the mixture, passing the molten mixture to a first rectifying tower, heating the molten mixture at a temperature of about 167–192° C. and at a pressure of about 39–86 mm. of mercury, continuously removing a low boiling fraction from the top of the tower and continuously passing the liquid bottoms from the first rectifying tower to a second rectifying tower also at a temperature of about 167–192° C. and under a vacuum of 39–86 mm. of mercury, continuously removing the higher boiling liquid residue from the bottom of the second rectifying tower and continuously removing purified meta- and para-dicyanobenzenes in the form of mixed vapors from the top of the second rectifying tower having the same ratio of meta- to para-isomers as was present in the crude mixture.

7. A method according to claim 6, in which the mixed vapors of meta- and para-dicyanobenzenes are cooled and condensed to a liquid.

References Cited by the Examiner

UNITED STATES PATENTS

| | | | |
|---|---|---|---|
| 2,456,561 | 12/48 | Lake et al. | 202—42 |
| 2,702,815 | 2/55 | Walker. | |
| 2,744,925 | 5/56 | Toland. | |
| 2,758,129 | 8/56 | Jennings. | |
| 2,783,266 | 2/57 | Toland. | |
| 2,833,807 | 5/58 | Farkas et al. | |
| 2,894,021 | 7/59 | Siggel | 202—56 |
| 3,091,629 | 5/63 | Fierce et al. | |

FOREIGN PATENTS 532,516   1/41   Great Britain.

NORMAN YUDKOFF, *Primary Examiner.*

GEORGE D. MITCHELL, *Examiner.*